Figure 3:
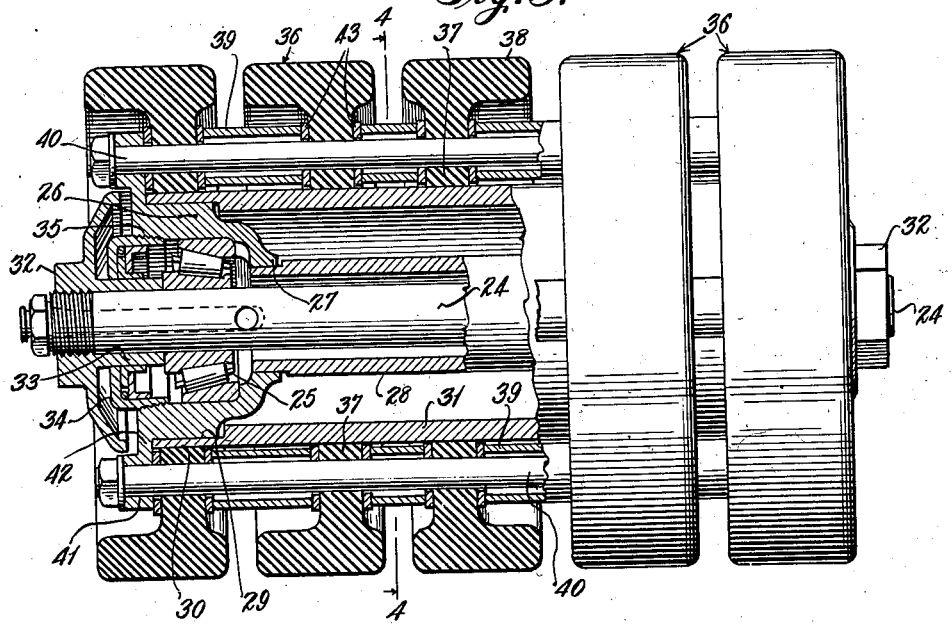

Aug. 15, 1939. C. R. WEISS ET AL 2,169,623
BELT CONVEYER AND IDLER
Filed March 12, 1938 3 Sheets-Sheet 1
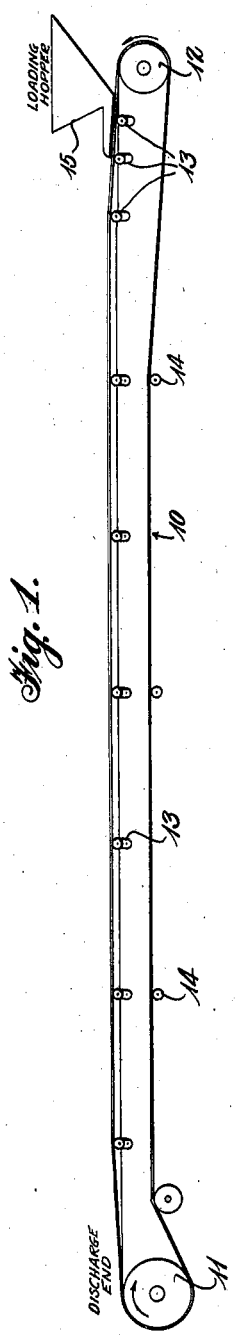
Inventors
Charles R. Weiss and
Richard W. Parker
By L. Donald Myers
Attorney Aug. 15, 1939  C. R. WEISS ET AL  2,169,623
BELT CONVEYER AND IDLER
Filed March 12, 1938  3 Sheets-Sheet 2

Inventors
Charles R. Weiss and
Richard W. Parker

By L. Donald Myers
Attorney

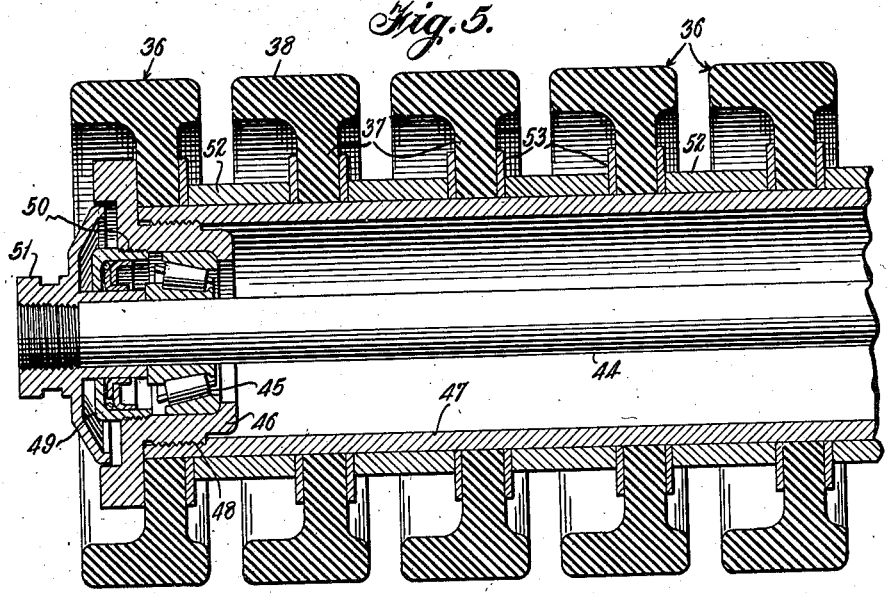
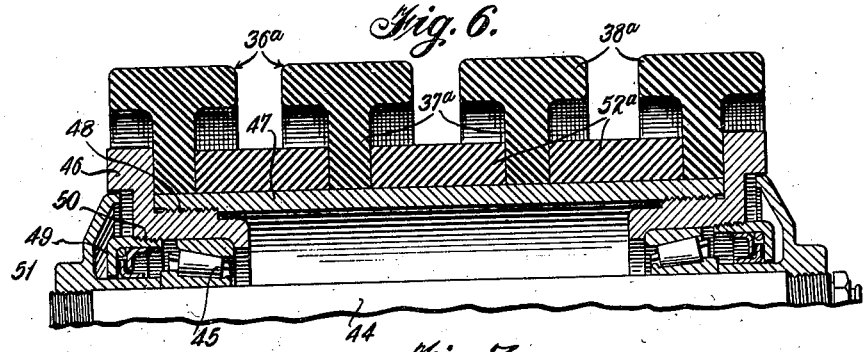
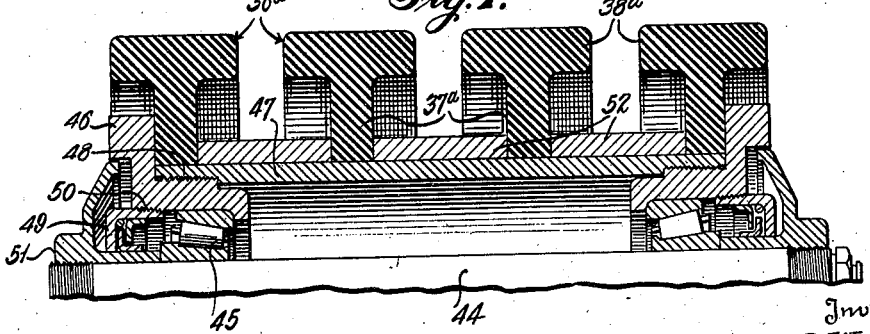

Patented Aug. 15, 1939

2,169,623

UNITED STATES PATENT OFFICE 2,169,623

BELT CONVEYER AND IDLER

Charles R. Weiss and Richard W. Parker, Indianapolis, Ind., assignors to Link Belt Company, a corporation of Illinois Application March 12, 1938, Serial No. 195,604

19 Claims. (Cl. 198—192)

This invention relates to new and useful improvements in belt conveyers and idlers for the same.

In the use of endless belts for conveying bulk material in lump, granular or powdered form, and the like, it is customary to employ idlers having metal rolls to support the active and inactive runs of the belt. The idlers may be of proper design to flatly support the belt in both runs or the idlers for the active run may be formed with angularly arranged rolls to trough the belt transversely the better to convey lump, granular or powdered material. In either event, the idlers afford a substantially continuous line contact for supporting the belt throughout its width which is a very desirable feature, particularly with fabric belts having a small number of plies.

In conveyers of this character, the material to be transported is deposited on the belt at one or more loading points and very often the feeding is by gravity. To properly sustain the belt at the loading point or points, the idlers are usually concentrated or placed closer together beneath these regions. The belt, backed up by non-yielding, metal idlers, naturally is continuously being subjected to severe impact blows delivered thereagainst by the falling material. When the material being conveyed possesses sharp points or corners, cutting of the belt results. The severe blows delivered by the falling material also are transmitted to the sustaining idlers and their supports.

Many materials normally handled by belt conveyers are of a highly abrasive character and frequently the moisture content, or other characteristics of the material, will cause corrosion of metal. As it is impossible to prevent at least some of the material from spilling on or otherwise coming into contact with the idlers, they are subjected to abrasion and corrosion.

In the inactive or return run of the conveyer, the belt surface which contacts the material being transported directly contacts the return idlers with the result that these non-yielding idlers cause the particles of material which cling to the belt surface to become imbedded therein. In an endeavor to prevent destruction of the belt by these imbedded particles, it is customary to locate at some place along the inactive portion of the conveyer, a device which will brush or scrape from the belt surface the adhering particles.

It is the primary object of this invention to provide belt conveyers of either the flat or trough type which are provided with idlers that will afford a substantially continuous support for the belt throughout its entire width; which will absorb shocks resulting from impact blows to thereby prevent destruction of the belt, the idlers and the idler supporting structures; which will resist abrasion and corrosion caused by the material being transported, and which will keep the load carrying surface of the conveyer belt throughout its entire width free from adhering particles of the material being conveyed with the result that additional devices employed solely for cleaning the belt may be dispensed with.

A further important object of the invention is to provide belt conveyer idler rolls which may be fabricated from a few different standard parts in such a manner that a full line of different sized idlers may be rapidly produced therefrom and made readily available for prompt shipment without having to carry in stock a full line of pre-fabricated rolls of the different standard sizes.

A still further object of the invention is to provide idlers which are designed for minimum weight and maximum resiliency and with which such parts that are subjected to wear or abuse can be quickly and easily replaced without making it necessary to discard practically the entire structure.

Another object of the invention is to provide idler rolls which have their belt contacting surfaces formed by a plurality of closely positioned, resilient elements of such sectional contour as to afford maximum elasticity and, in the event that several of such rolls are angularly disposed for handling a troughed belt, to be so arranged as to reduce the gap between the ends of adjacent rolls to an absolute minimum.

Other objects and advantages of the invention will be apparent during the course of the following description.

In the accompanying drawings forming a part of this specification and in which like numerals are employed to designate like parts throughout the same, Figure 1 is a diagrammatic view of a belt conveyer of the troughed type in which the active and inactive runs are supported by idlers of the character which embody this invention, Figure 2 is a detail elevational view of an idler assembly and discloses the idlers employed for supporting the active and inactive runs of the conveyer belt.

Figure 4:
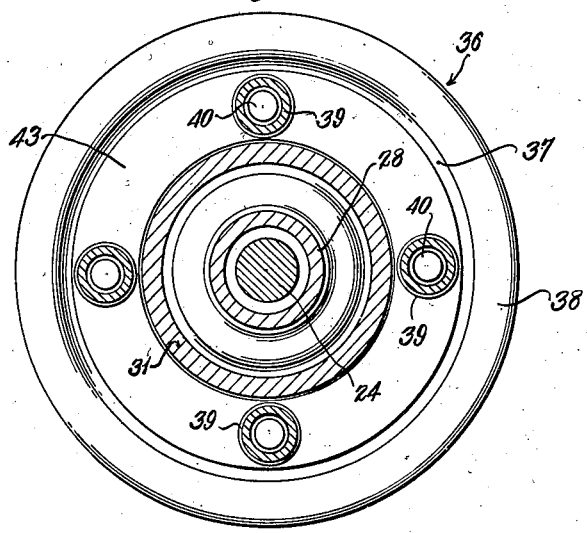

Figure 3 is a partly elevational view and partly longitudinal sectional view of one form of idler roll embodying this invention, Figure 4 is a transverse sectional view taken on line 4—4 of Fig. 3, Figure 5 is a fragmentary longitudinal sectional view of a modified form of idler roll embodying this invention, Figure 6 is a fragmentary longitudinal sectional view of a further modified form of idler roll embodying this invention, and Figure 7 is a fragmentary longitudinal sectional view of a still further modified form of idler roll.

In the drawings, wherein for the purpose of illustration are shown the preferred embodiments of this invention, the reference character 10 designates, in Fig. 1, the endless belt of a conveyer. This belt is trained over the end rollers 11 and 12 in the conventional manner. Between these end rollers, the active run of the belt is supported by the idlers 13. The inactive run of the belt is supported by the idlers 14. When the conveyer is employed for handling bulk material in lump, granular or powdered form, the idlers 13 include a plurality of rolls which are angularly arranged, as disclosed in Fig. 2, for the purpose of troughing the belt. Such bulk material is usually delivered to the upper or active run of the belt by means of a hopper 15 which feeds by gravity onto the conveyer belt. This feeding of material to the conveyer by gravity imposes impact blows on the belt as it passes the loading point. It is customary, therefore, to concentrate two or more idlers 13 at and adjacent the loading point to properly sustain the belt against impact blows.

It is customary to employ a greater number of idlers for supporting the upper or active run of the belt than are employed for supporting the inactive or lower run because the upper run carries the load of the materials being conveyed. The idlers for the inactive or lower run are usually vertically aligned with certain ones of the idlers for the active run, in the manner best illustrated in Fig. 2.

The supporting structure for the conveyer usually includes channel iron beams, or the like, 16 at opposite sides of the same and to which the various idlers are connected. In Fig. 2, the idler 13 is illustrated as including a frame 17 which is mounted on the channel iron members 16 by means of the legs 18. The frame 17 includes a suitable number of properly shaped and spaced bracket arms 19 which support the idler rolls 20 angularly arranged with respect to each other for troughing the upper or active run of the conveyer belt 10. It will be noted that the rolls 20 are positioned at their adjacent ends in such a manner that a comparatively small gap 21 is left between the rollers at their upper sides. This comparatively small gap is made possible by the construction of the rolls which will be described at a later point.

The idler 14 disclosed in Fig. 2 consists of a single roll 22 which is supported at its opposite ends by means of bracket arms 23 connected to and depending from the channel iron members 16.

The rolls 20 and 22 differ from each other as to length only, for all of the rollers may be formed in detail in accordance with any of the modified forms of structures disclosed in Figs. 3 to 7, inclusive. The idler rolls 22 are formed by assembling a greater number of units, of the character to be described at a later point, than are necessary for the rolls 20.

Referring now to the form of idler roll disclosed in Figs. 3 and 4, there is shown a shaft 24 which has mounted on each end of the same an anti-friction roller bearing unit 25. Journaled on each one of the bearing units is a head member 26. Each head member is provided with an inwardly directed, annular flange portion 27 which forms an opening to receive and seat the reduced end of the pipe section 28. This pipe is concentrically arranged with respect to the shaft 24 and reduces the capacity of the reservoir for the bearing lubricant. The heads 26 also each have an annular seat 29 which receives the end portion 30 of the tubular shell 31. For the purpose of maintaining the anti-friction bearings 25, the heads 26, the spacer pipe 28, and the shell 31 in proper assembled relation with respect to the shaft 24, a nut 32 is threaded on each end of the shaft. This nut includes a central sleeve 33 which bears against the inner race of the bearing 25, as illustrated in Fig. 3, for maintaining the bearing in place. This sleeve 33 also cooperates with a grease seal 34 which is threaded at 35 to a portion of the head 26.

Encircling the shell 31 are a suitable number of annular members 36 which are formed of rubber, or other suitable shock resisting material which possesses a desired degree of elasticity. Each one of these members includes a web portion 37 on the periphery of which is formed an axially enlarged rim or tread portion 38. It will be seen that the rim or tread portion 38 of each member 36 takes the form of a ring which projects laterally from the web 37 to a greater extent on one side of the web than on the other side. In other words, this ring-like rim or tread has a greater overhang on one side of the web 37 than on the other side. As disclosed in Fig. 3, the annular members 36 may be assembled with the greater overhang extending in either direction.

For the purpose of spacing the annular shock resisting members 36 as desired along the length of the shell 31, spacer tubes 39 are positioned between the members 36 and are arranged around the shell 31 in the manner best illustrated in Fig. 4. These spacer tubes 39 are held in position by means of tie rods 40 which pass through suitable apertures formed in the webs 37 of the various members 36. These tie rods 40 also pass through openings 41 formed in the peripheral flange portion 42 of each head member 26. To prevent the spacer tubes 39 from damaging the side walls of the webs 37, apertured washers 43 are positioned on both sides of each web 37. It will be appreciated that these washers 43 also function to clamp and reinforce the webs 37 of the various rubber shock resisting members 36.

It will be appreciated that with this type of assembly, the various elements may be readily separated from each other and as readily reassembled. This makes possible replacement of any damaged or worn-out elements of the roller assembly. It also will be appreciated that rollers of any desired length may be quickly made by varying the sizes of the spacer pipe 28, the shaft 24 and the shell 31, and by assembling the proper number of members 36 on the shell.

Figure 5 discloses a modified form of idler roll structure. A central shaft 44 is provided and has suitably mounted on each end of the same an anti-friction bearing assembly 45. These bearings rotatably support the head members 46, as clearly illustrated. To maintain the heads 46 properly spaced with respect to each other, a shell 47 is threadedly connected, as at 48, to the heads.

For the purpose of excluding dust, and other foreign matter from the bearings 45 and to retain lubricant for the bearings, a lubricant seal 49 is threaded at 50 to each head 46. The heads 46 and the bearing units 45 are maintained in place on the shaft 44 by means of a nut 51 which is threadedly connected to the end of the shaft.

A suitable number of shock absorbing and resisting members 36 are mounted on the shell 47. These members 36 are of the same shape as the similar members 36 illustrated and described in connection with Figs. 3 and 4. These members 36 include web portions 37 and rim or tread portions 38.

To maintain the various shock absorbing and resisting members 36 in proper spaced relation with respect to each other, spacer rings 52 are provided and are arranged between each adjacent pair of members 36. These rings 52 slidably fit around the shell 47. Washers 53 are provided at the opposite ends of each spacer ring 52 for bracing and reinforcing the web portions 37 of the members 36 and for preventing the ends of the spacer rings 52 from cutting the side walls of the webs 37.

It will be appreciated that by merely removing the nut 52 from one end of the shaft 44 and by disconnecting the head 46 from the adjacent end of the sleeve or shell 47, that the various shock absorbing and resisting members 36 and their spacing rings 52 and washers 53 may be readily and quickly removed from the shell 47. In this way, the roller may be quickly disassembled for purposes of repair. By employing shafts 44 and shells 47 of different lengths, idler rolls of different sizes may be produced.

Fig. 6 discloses a further modified form of idler roll. This roll differs from the roll structure disclosed in Fig. 5 only with reference to the cross sectional shape of the resilient shock absorbing and resisting members 36a and the type of spacer rings 52a which are employed for maintaining the members 36a in proper spaced relation.

In Figs. 3 and 5, the resilient members 36 have their webs 37 and rims or tread portions 38 so arranged relative to each other as to be of L-shape in section. In Fig. 6, the webs 37a are centrally positioned with respect to the rims or treads 38a, with the result that they are collectively of T-shape rather than L-shape. The extent of overhang of the rim or tread 38a is the same on each side of its associated web 37a.

The spacing rings 52a are made either of natural or synthetic rubber, or some other resilient, non-corrosive material as distinguished from the formation of the rings 52 in the roller of Fig. 5 of metal. With the spacing rings 52a made of rubber, or the like, it is unnecessary to employ washers to prevent the rings from damaging the webs of the members 36a. The rubber rings 52a, also, are made thick enough to properly reinforce or brace the webs 37a.

The remaining elements of this roller are the same as those disclosed in Fig. 5, and for that reason the same reference characters will be applied thereto.

Fig. 7 discloses a form of idler roll which differs from the form shown in Fig. 6 only to the extent of employing the metallic spacer rings 52, of the roll shown in Fig. 5, instead of the rubber spacer rings 52a, shown in Fig. 6. Otherwise, the roll of Fig. 7 is the same as the roll of Fig. 6. The same reference characters, therefore, will be applied to the remaining elements.

It will be appreciated that with all of the forms of idler rolls disclosed in Figs. 3 to 7, inclusive, the elastic and resilient shock absorbing and resisting members are provided with rim or tread portions which will flex or be deformed readily to absorb shocks imposed upon the belt traveling over these rolls. The said members, also, will yield to allow the material or objects being conveyed by the belt to pass smoothly over the idler rolls without being jolted or jarred. Due to the overhang provided at each side of each one of the shock absorbing and resisting members, the rim or tread portion of each member will flex or yield to absorb impact blows more readily than would be possible if the web members were of the same width as the rim or tread members.

Due to the close spacing of the various shock absorbing and resisting members, each roll provides a substantially continuous supporting surface for the conveyer belt which is co-extensive with the length of the roll. By forming the members 36 and 36a of rubber, or the like, these members will effectively resist abrasion and corrosion.

Due to the fact that the members 36 and 36a will yield or flex readily, a kneading of the contacting surface of the belt will be accomplished by the said members with the result that the said members will keep the surfaces of the belt free of particles of the material being conveyed which might otherwise tend to cling to and be worked into the surface of the belt.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, we claim:

1. In a belt conveyer idler, a roll comprising a shaft, a shell journaled on said shaft, a plurality of annular elastic members mounted on said shell, each of said members including a web portion and a rim portion which is of greater width than the thickness of the web portion so as to project laterally of the web, and means arranged between adjacent members for spacing their rim portions a sufficient distance to allow for free independent flexing of said portions, said spacing means engaging the web portions only of the members throughout but a portion of their depth to permit free flexing of at least a part of each web portion.

2. A belt conveyer idler, comprising a shaft, a shell journaled on said shaft, a plurality of annular elastic members mounted on said shell, each of said members including a web portion and a rim portion which is of greater width than the thickness of the web portion so as to provide a lateral projection on both sides of the web, and means arranged between adjacent members for spacing their rim portions a sufficient distance to allow for free independent flexing of said portions, said spacing means engaging the web portions only of the members throughout but a portion of their depth to permit free flexing of at least a part of each web portion, and means at each end of the shell for removably retaining the members and the spacing means on said shell.

3. In a belt conveyer idler, a roll comprising a shaft, a shell journaled on said shaft, a plurality of annular elastic members mounted on said shell, each of said members including a web portion and a rim portion which is of greater width than the thickness of the web portion so as to provide a lateral projection on the web which may flex radially of the roll, and means arranged between adjacent members and associated with said web portions for a part of their depth only for spacing the rim portions a sufficient distance to allow for lateral flexing of both the rim portions and a part of each web portion.

4. In a belt conveyer idler, a roll comprising a shaft, a shell journaled on said shaft, a plurality of annular elastic members mounted on said shell, each of said members including a web portion and a rim portion which is of greater width than the thickness of the web portion so as to provide a lateral projection on both sides of the web, and a spacer ring between each adjacent pair of members fitted on the shell, said spacer rings having a thickness less than the depth of the web portions of said members so as to reinforce the inner portions of the webs while leaving the outer portions of the webs and their rims free to flex.

5. In a belt conveyer idler, a roll comprising a shaft, a shell journaled on said shaft, a plurality of annular elastic members mounted on said shell, each of said members including a web portion and a rim portion which is of greater width than the thickness of the web portion so as to project laterally of the web, and a spacer ring between each adjacent pair of members fitted on the shell, and a washer between each member and the adjacent surfaces of said spacer rings, said washers having a radial thickness less than the depth of the web portions of said members so as to reinforce the inner portions of the webs while leaving the outer portions of the webs and their rims free to flex.

6. In a belt conveyer idler, a roll comprising a shaft, a shell journaled on said shaft, a plurality of annular elastic members mounted on said shell, each of said members including a web portion and a rim portion which is of greater width than the thickness of the web portion so as to project laterally of the web, and means arranged between adjacent members for spacing their rim portions a sufficient distance to allow for free independent flexing of said portions, said spacing means comprising cylindrical members associated with the web portions only of the members throughout but a part of their depth to permit free flexing of at least a part of each web portion.

7. In a belt conveyer idler, a roll comprising a cylindrical support, a plurality of annular elastic members mounted on said support, each of said members including a web portion and a rim portion which is of greater width than the thickness of the web portion so as to project laterally of the web, and means arranged between adjacent members to engage said web portions only and possessing greater axial width than the width of the laterally projecting rim portions arranged between adjacent elastic members so as to space said rim portions to allow for free independent flexing of their rim portions.

8. In a belt conveyer idler, a roll comprising a cylindrical support, a plurality of annular elastic members mounted on said support, each of said members including a web portion and a rim portion which is of greater width than the thickness of the web portion and arranged relative thereto so as to provide a lateral projection on one side of the web portion which is greater than the projection on the other side, and means arranged between adjacent members to engage said web portions only and possessing greater width axially of the roller than the width of the laterally projecting rim portions arranged between adjacent elastic members so as to space said rim portions to allow for free independent flexing of their rim portions.

9. In a belt conveyer idler, a roll comprising a cylindrical support, a plurality of annular elastic members mounted on said support, each of said members including a web portion and a rim portion which is of greater width than the thickness of the web portion so as to project laterally of the web, means arranged between adjacent members to engage said web portions only and possessing greater axial width than the width of the laterally projecting rim portions arranged between adjacent elastic members so as to space said rim portions to allow for free independent flexing of their rim portions, and means at each end of the support for removably retaining the elastic members and the spacing members on the support.

10. In a belt conveyer idler, a roll comprising a cylindrical support, a plurality of annular elastic members mounted on said support, each of said members including a web portion and a rim portion which is of greater width than the thickness of the web portion so as to project laterally of the web, and elastic means arranged between adjacent members to engage said web portions only and possessing greater width axially of the roll than the width of the laterally projecting rim portions arranged between adjacent elastic members so as to space said rim portions to allow for free independent flexing of their rim portions.

11. In a belt conveyer idler, a roll comprising a cylindrical support, a plurality of annular elastic members mounted on said support, each of said members including a web portion and a rim portion which is of greater width than the thickness of the web portion so as to project laterally of the web, and a plurality of annular members assembled between each adjacent pair of elastic members to engage said web portions only and possessing proper combined dimensions axially of the roll and relative to the associated projecting rim portions of adjacent elastic members so as to space said rim portions to allow for free independent flexing of said rim portions.

12. In a belt conveyer idler, a roll comprising a cylindrical support, a plurality of annular elastic members mounted on said support, each of said members including a web portion and a rim portion which is of greater width than the thickness of the web portion so as to project laterally of the web, and a plurality of sets of annular members assembled between each adjacent pair of elastic members to engage said web portions only and each set possessing proper combined dimensions axially of the roll and relative to the associated projecting rim portions of adjacent elastic members so as to space said rim portions to allow for free independent flexing of said rim portions.

13. In a belt conveyer idler, a roll comprising a cylindrical support, a plurality of annular elastic members mounted on said support, each of said members including a web portion and a rim portion which is of greater width than the thickness of the web portion so as to project laterally of the web, a plurality of sets of annular members assembled between each adjacent pair of elastic members to engage said web portions only and each set possessing proper combined dimensions axially of the roll and relative to the associated projecting rim portions of adjacent elastic members so as to space said rim portions to allow for free independent flexing of said rim portions, and means at each end of the support for removably retaining the elastic members on the support.

14. In a belt conveyer idler, a roll comprising a cylindrical support, a plurality of annular elastic members mounted on said support, each of said members including a web portion and a rim portion which is of greater width than the thickness of the web portion so as to project laterally of the web, a plurality of sets of annular members assembled between each adjacent pair of elastic members to engage said web portions only and each set possessing proper combined dimensions axially of the roll and relative to the associated projecting rim portions of adjacent elastic members so as to space said rim portions to allow for free independent flexing of said rim portions, means at each end of the support for removably retaining the elastic members on the support, and rods extending axially of the roll and passing through the retaining means at the ends of the support, the elastic members and the sets of annular spacing members for holding all of the parts assembled.

15. In a belt conveyer idler, a roll comprising a shaft, a sleeve having a head at each end journaled on said shaft, and a plurality of annular, solid, elastic members mounted on said sleeve, said members having enlarged rim portions closely positioned and formed with flat peripheral surfaces to afford a deformable cylindrical support for the major portion of a belt, said rim portions being sufficiently unconfined to allow for independent flexing axially of the roll.

16. In a belt conveyer idler, a roll comprising a shaft, a shell having a head at each end journaled on said shaft, and a plurality of annular, solid, elastic members mounted on said shell, each of said members including a web portion and an axially enlarged rim, said members having their rim portions closely positioned and formed with flat peripheral surfaces to afford a deformable cylindrical support for the major portion of a belt, said rim portions being sufficiently unconfined to allow for independent flexing axially of the roll.

17. In a belt conveyer idler, a roll comprising a shaft, a shell having a head at each end journaled on said shaft, and a plurality of annular, solid, elastic members mounted on said shell, each of said members including a web portion and an axially enlarged rim, said members being closely positioned at their rim portions and formed with flat peripheral surfaces to afford a deformable cylindrical support for the major portion of a belt, and means positioned between said members and engageable with their webs only for spacing the members and reinforcing the webs but leaving the rim portions sufficiently unconfined to allow for independent axial flexing.

18. In a belt conveyer idler, a roll comprising a shaft, a shell concentric with and rotatably supported on the shaft, a plurality of annular, solid, elastic members fitted on the shell and having enlarged rim portions with flat peripheral surfaces, and means for maintaining said elastic members spaced relative to each other throughout the length of the shell to allow for free independent flexing of the outer portions of the same, said spacing means including a ring encircling the shell and positioned between each adjacent pair of annular members, and a washer encircling the shell and interposed between each end of each ring and the adjacent annular member.

19. In a belt conveyer idler, a roll comprising a shaft, a shell concentric with and rotatably supported on the shaft, bearing means for rotatably supporting the shell on the shaft, a plurality of annular, solid, elastic members positioned on the shell and having enlarged rim portions and flat peripheral surfaces, cylindrical spacing members interposed between the various annular elastic members to maintain the same properly spaced throughout the length of the shell, and washers interposed between the ends of the cylindrical spacing members and the annular elastic members, said washers engaging only the inner portions of the annular elastic members so as to leave the outer rim portions free for independent flexing.

CHARLES R. WEISS.
RICHARD W. PARKER.